United States Patent
Cooper et al.

(10) Patent No.: US 7,690,097 B1
(45) Date of Patent: Apr. 6, 2010

(54) METHODS OF ASSEMBLING WELL SCREENS

(75) Inventors: Carl Cooper, Houston, TX (US); Phong Vu, Houston, TX (US)

(73) Assignee: BJ Services Company, Houston, TX (US)

( * ) Notice: Subject to any disclaimer, the term of this patent is extended or adjusted under 35 U.S.C. 154(b) by 403 days.

(21) Appl. No.: 11/644,097

(22) Filed: Dec. 22, 2006

Related U.S. Application Data

(60) Provisional application No. 60/755,895, filed on Jan. 3, 2006.

(51) Int. Cl.
*B23P 11/02* (2006.01)

(52) U.S. Cl. ......................... 29/447; 166/233
(58) Field of Classification Search .................. 29/447; 166/233, 230, 236, 227
See application file for complete search history.

(56) References Cited

U.S. PATENT DOCUMENTS

| | | | | |
|---|---|---|---|---|
| 2,312,459 | A | * | 3/1943 | Williams et al. ............... 29/447 |
| 2,327,686 | A | * | 8/1943 | Williams et al. ............... 29/447 |
| 2,346,885 | A | * | 4/1944 | Williams et al. ............ 166/234 |
| 4,200,218 | A | * | 4/1980 | Koehler ....................... 228/165 |
| 4,314,129 | A | | 2/1982 | Wilson et al. |
| 4,378,840 | A | * | 4/1983 | Lilly ............................. 166/233 |
| 4,416,331 | A | * | 11/1983 | Lilly ............................. 166/236 |
| 5,394,600 | A | * | 3/1995 | Chen ............................. 29/447 |
| 5,931,232 | A | | 8/1999 | Echols et al. |
| 5,979,551 | A | * | 11/1999 | Uban et al. ................... 166/233 |
| 6,390,192 | B2 | * | 5/2002 | Doesburg et al. ........... 166/230 |
| 6,530,431 | B1 | | 3/2003 | Castano-Mears et al. |
| 6,715,544 | B2 | * | 4/2004 | Gillespie et al. ............. 166/230 |
| RE39,940 | E | * | 12/2007 | Frejborg et al. ............. 210/232 |
| 2001/0003313 | A1 | * | 6/2001 | Doesburg et al. ........... 166/227 |
| 2002/0038707 | A1 | * | 4/2002 | Gillespie et al. ............. 166/230 |
| 2002/0070031 | A1 | | 6/2002 | Voll et al. |
| 2005/0028977 | A1 | * | 2/2005 | Ward ........................... 166/278 |
| 2005/0061501 | A1 | * | 3/2005 | Ward et al. ................... 166/278 |
| 2005/0082060 | A1 | * | 4/2005 | Ward et al. ................... 166/278 |
| 2005/0086807 | A1 | | 4/2005 | Richard et al. |
| 2005/0126779 | A1 | * | 6/2005 | Arterbury ..................... 166/278 |
| 2005/0205263 | A1 | | 9/2005 | Richard |
| 2007/0023331 | A1 | * | 2/2007 | Laakso ........................ 209/395 |
| 2007/0246226 | A1 | * | 10/2007 | Macias et al. ................ 166/386 |
| 2008/0209710 | A1 | * | 9/2008 | Ferguson et al. .............. 29/447 |

OTHER PUBLICATIONS

Weatherford "Well Screen Technologies" brochure, 2008, pp. 1-12.
Weatherford "Well Screen" brochure, pp. 1-13.
Weatherford "Dura-Grip® HD Screens" brochure, 2004, 1 page.
BJ Services Company "ProWeld™ Well Screens" brochure, Jul. 27, 2004, 1 page.
Schlumberger "Wire-Wrap Screens" brochure, Jan. 2004, 2 pages.
Wedgetech Australia, screen product information at website http://www.wedgetech.com/au/screencylinders.htm, 2 pages dated Nov. 8, 2005.

* cited by examiner

*Primary Examiner*—David P Bryant
*Assistant Examiner*—Christopher M Koehler
(74) *Attorney, Agent, or Firm*—E. Randall Smith; Jones & Smith, LLP

(57) ABSTRACT

In some embodiments, methods for securing a cylindrical screen jacket to a base pipe include heating the screen jacket to expand it so that its inner diameter becomes greater than the outer diameter of the base pipe, positioning the base pipe at least partially within the screen jacket and allowing the screen jacket to cool and contract, engaging the base pipe.

23 Claims, 4 Drawing Sheets

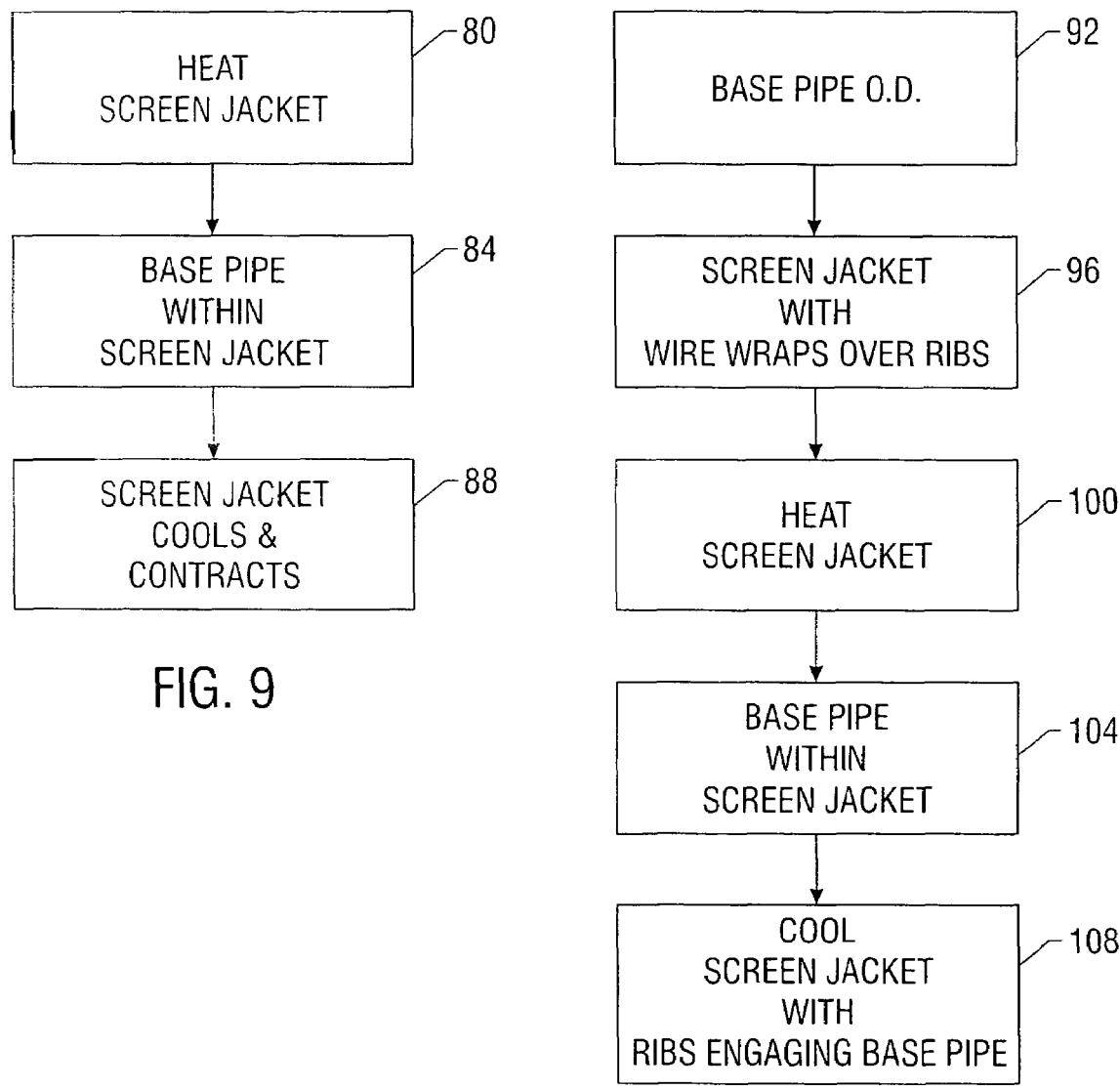

METHODS OF ASSEMBLING WELL SCREENS

This application claims priority to U.S. Provisional Application Ser. No. 60/755,895 filed Jan. 3, 2006 and entitled Screen Assembly and Methods of Manufacture, the entire disclosure of which is hereby incorporated by reference herein in its entirety.

FIELD OF THE INVENTION

The present invention relates generally to screens assemblies. In some embodiments, the invention involves a screen jacket that is heat shrunk onto a base pipe.

BACKGROUND OF THE INVENTION

The use of screen assemblies is well known. For example, assemblies including one or more cylindrical screen jackets disposed over perforated based pipes are commonly used in downhole petroleum production operations. Often, the screen jacket is formed with wire wrapped around elongated, axially-oriented rib members. The spaces between adjacent wire wraps allow permitted flow through the screen jacket. In some applications, the screen jacket assists in holding gravel packing in the hole or casing. In other applications, such as open-hole completions, the screen jacket may be used to directly hold back the formation. Thus, in these examples, the size of the spaces between wire wraps in the screen jacket is typically critical for effective operation. Furthermore, these screen assemblies may be subject to substantial loads and stresses during use. Accordingly, the robustness of the screen jacket and positioning of the screen jacket relative to the base pipe is also often critical for effective operation.

Various types of screen assemblies have been used. For the cylindrical-type screen assemblies referenced above, for example, the screen jacket may be formed or wrapped directly onto the base pipe in a large screen assembly machine. Various challenges exist with this method. For example, maintaining the proper orientation and preventing bowing of the pipe during the screen wrapping operation may be difficult. This challenge is common, in particular, where the base pipe is not perfectly straight or round or is very large (e.g. length of 40' at over 20 lbs/ft). Consequently, it may be difficult to form the wire wraps with the necessary precise spacing. Furthermore, this assembly technique may be slow and cause substantial wear to the screen assembly machine.

For another example, the screen jacket may be formed with an inner diameter that is larger than the outer diameter of the base pipe, allowing the screen jacket to be slid over and welded to the base pipe. With this technique, a gap exists between the screen jacket and base pipe. During deployment and use, the screen member could buckle, collapse or deform into the gap. Further, each weld may be subject to fail or give out, causing the screen to move relative to, or disconnect from, the base pipe.

It should be understood that the above-described examples, features and/or disadvantages are provided for illustrative purposes only and are not intended to limit the scope or subject matter of the claims of this patent application or any patent or patent application claiming priority hereto. Thus, none of the appended claims or claims of any related application or patent should be limited by the above discussion or construed to address, include or exclude the cited examples, features and/or disadvantages, except and only to the extent as may be expressly stated in a particular claim.

Accordingly, there exists a need for a screen assembly and methods of manufacture thereof having one or more of the following attributes, capabilities or features: involves heat shrinking the screen jacket onto the base pipe; ensures accurate and/or consistent spacing between wire wraps of the screen jacket; maintains good slot tolerances on the screen jacket; eliminates or minimizes any gap between the screen jacket and the base pipe; provides a tight, firm and/or reliable fit of the screen jacket to the base pipe along the entire length of the screen jacket; provides an interference fit between the screen jacket and base pipe; includes a screen assembly that is robust; includes a base pipe and screen jacket arrangement that essentially acts as a single unit during operations; includes a screen jacket that is resistant to collapsing or deforming during use; includes a screen jacket that is substantially resistant to typical loads transmitted thereto; includes a screen jacket that is resistant to undesirable shifting relative to, or separation from, the base pipe during use; eliminates, reduces or minimizes the use of welds to connect the screen jacket and base pipe; involves an assembly process that is simple, quick and/or efficient and minimizes wear upon screen assembly machines; or a combination thereof.

BRIEF SUMMARY OF THE INVENTION

Various embodiments of the present invention involve a method of securing a cylindrical screen jacket to a base pipe, the screen jacket having a plurality of elongated ribs extending along the inner diameter thereof. The screen jacket is heated so that its inner diameter becomes greater than the outer diameter of the base pipe. The base pipe is positioned at least partially within the heated screen jacket. The screen jacket is allowed to cool and shrink fit onto the base pipe to form an interference fit between the elongated ribs and the base pipe.

The following features are sample optional features of these embodiments. The screen jacket may be formed with an original inner diameter that is not larger than the outer diameter of the base pipe. The engaged screen jacket and base pipe form a screen assembly that is inserted into a downhole environment for petroleum production operations. The screen jacket may be heated in an oven at between approximately 800° F.-1200° F. for between approximately 10-15 minutes. At least one end ring may be heat shrunk at least partially onto the screen jacket and welded to the base pipe.

In certain embodiments, the present invention involves a method of assembling a screen assembly useful in a downhole environment. The screen assembly includes a screen jacket and a base pipe having a pertinent outer diameter. The screen jacket is formed with an original inner diameter that is not larger than the pertinent outer diameter of the base pipe. The screen jacket is heated so that its inner diameter is greater than the pertinent outer diameter of the base pipe. The base pipe is disposed at least partially within the screen jacket. The screen jacket is allowed to cool and contract so that the cooled screen jacket engages the base pipe.

The following features are sample optional features of these embodiments. The screen jacket may firmly engage the base pipe along the entire length of the screen jacket, avoiding relative movement therebetween during use without the necessity of welds therebetween. A tooling member may be used to form the screen jacket. A tooling ring may be used along with the tooling member to form the screen jacket with the original inner diameter. The screen jacket formation may include wrapping wire over a plurality of elongated, axially-oriented ribs to form a plurality of alternating wire wraps and slots, wherein the size of the slots is generally consistent and within desired tolerances. The elongated, axially-oriented ribs may engage the base pipe without any gap therebetween.

The present invention includes embodiments of a method of manufacturing a screen assembly for downhole use, the screen assembly including at least one perforated base pipe and at least one screen jacket. The pertinent outer diameter of the perforated base pipe is determined and the screen jacket is formed to have a cylindrical shape and an original inner diameter based upon the pertinent outer diameter of the base pipe. The screen jacket is heated to cause the inner diameter of the screen jacket to expand a desired extent. The perforated base pipe is located at least partially within the screen jacket and the screen jacket is allowed to cool so that it contracts into firm engagement with the perforated base pipe.

The following features are sample optional features of these embodiments. The screen jacket may cool to form an interference fit with the base pipe, whereby the screen jacket is resistant to movement relative to and separation from the base pipe. The screen jacket may be resistant to collapsing and deforming during use. The base pipe and screen jacket combination may be deployed into a borehole, whereby the screen jacket is resistant to movement relative to and separation from the base pipe. A centralizer blade may be connected between first and second screen jackets that are heat shrunk onto the base pipe.

Accordingly, the present invention includes features and advantages which are believed to enable it to advance screen technology. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

The following figures are part of the present specification, included to demonstrate certain aspects of presently preferred embodiments of the invention and referenced in the detailed description herein.

FIG. 9 is a flow diagram illustrating the process performed by an embodiment of a downhole screen assembly method in accordance with the present invention; and FIG. 10 is a flow diagram illustrating the process performed by another embodiment of a downhole screen assembly method in accordance with the present invention.

DETAILED DESCRIPTION OF PRESENTLY PREFERRED EMBODIMENTS

Figure 1:
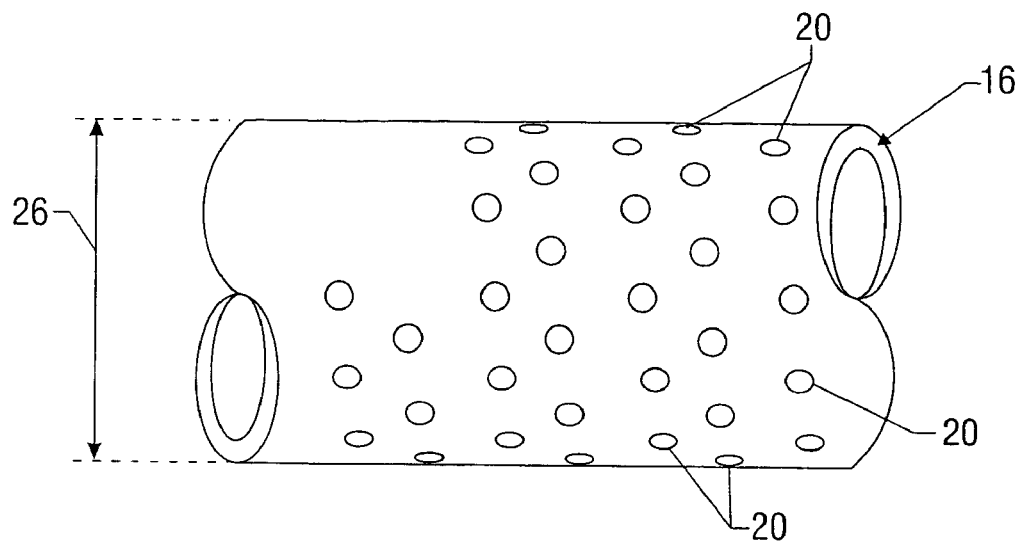
FIG. 1 illustrates a perforated base pipe.

Characteristics and advantages of the present invention and additional features and benefits will be readily apparent to those skilled in the art upon consideration of the following detailed description of presently preferred embodiments of the claimed invention and referring to the accompanying figures. It should be understood that the description herein and appended drawings, being of preferred embodiments, are not intended to limit the appended claims or the claims of any patent or patent application claiming priority to this application. On the contrary, the intention is to cover all modifications, equivalents, and alternatives falling within the spirit and scope of the claims, and many changes may be made to the particular embodiments and details disclosed herein without departing from such spirit and scope.

In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean the invention of every possible embodiment of the invention or any particular claim or claims. Thus, the subject matter of each such reference should not be considered as necessary for, or part of, every embodiment of the invention or any particular claim(s) merely because of such reference. Also, it should be noted that reference herein and in the appended claims to components and aspects in a singular tense does not necessarily limit the present invention to only one such component or aspect, but should be interpreted generally to mean one or more, as may be suitable and desirable in each particular instance.

Referring initially to FIG. 1, an example perforated base pipe 16 is shown having an outer diameter 26 and multiple openings 20. For example, base pipes 16 having diameters ranging from 2⅜"-6⅝" have been used. If the outer diameter of the base pipe 16 is inconsistent along the length of the base pipe 16, such as if the base pipe 16 is not perfectly straight or its circumference is not perfectly round, the outer diameter 26 as referenced herein may, if desired, represent a particular value, such as the average or smallest outer diameter of the base pipe 16.

Figure 2:
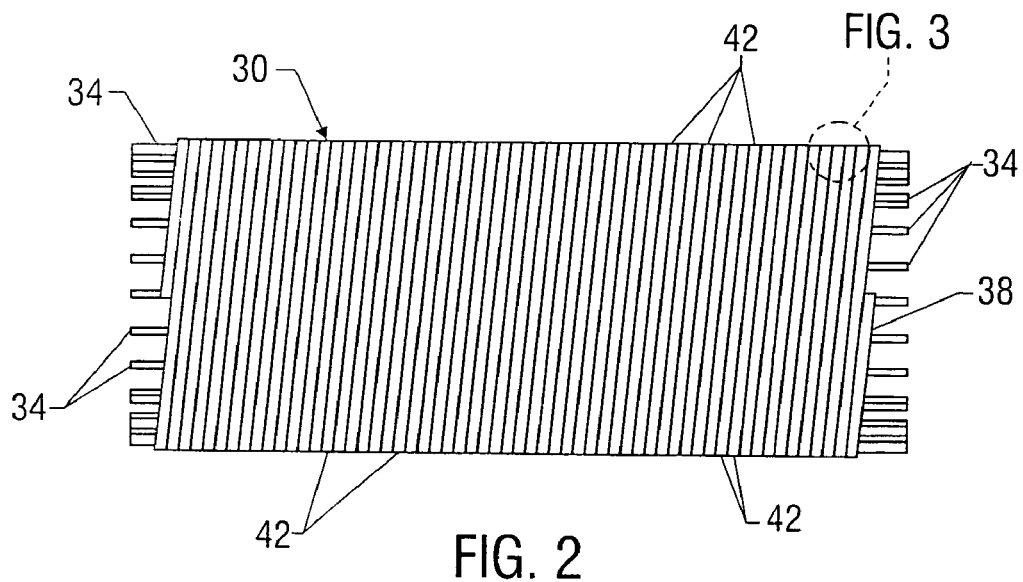
FIG. 2 illustrates a screen jacket having wire wrapped around multiple ribs.
Figure 3:
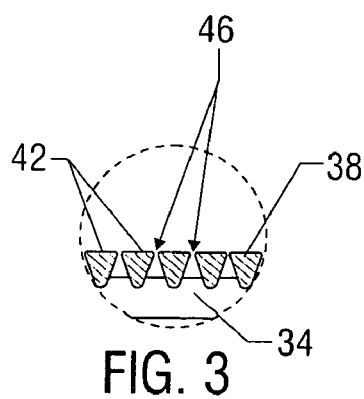
FIG. 3 is an enlarged partial cross-sectional view of wire wraps of the screen jacket of FIG. 2.
Figure 4:
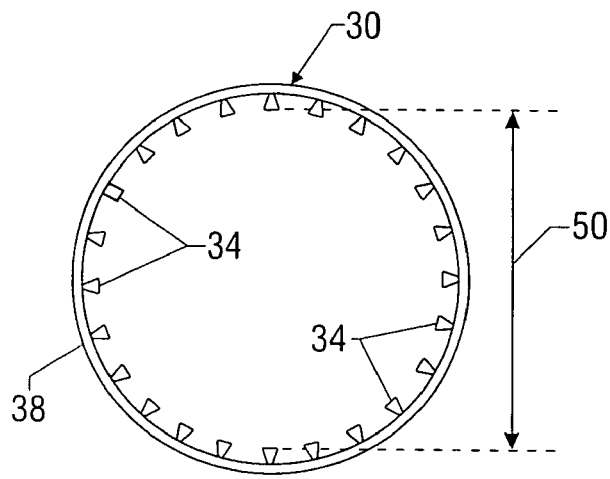
FIG. 4 is an end view of the screen jacket of FIG. 2.

FIGS. 2-4 illustrates an example screen jacket 30 having a cylindrical shape and being useful with a base pipe. Generally, screen jackets 30 may vary in length depending upon one or more factor, such as, for example, the perforated length of the base pipe with which they are used. Further, multiple sections of screen jackets 30 may be used with a single base pipe 16. The illustrated screen jacket 30 is formed with numerous elongated, axially-oriented, rib members 34 arranged in a circular pattern, and one or more wire 38 radially wound around the ribs 34 in multiple wraps 42. As shown in FIG. 3, each wrap 42 of the wire 38 is spaced apart from adjacent wraps 42, forming a multitude of openings, or slots 46. The ribs 34 support the wire wraps 42 and will engage the base pipe.

The above examples of the base pipe 16 and screen jacket 30 are known in the art and may have any suitable form, shape, configuration and dimensions. Moreover, it should be understood that the present invention is not limited to any of the details of the base pipe 16 and screen jacket 30 as described above or shown in FIGS. 1-4. Any suitable base pipe and screen jacket may be used. For example, the screen jacket may be formed by a weave of wires into a cylindrical shape.

Figure 5:
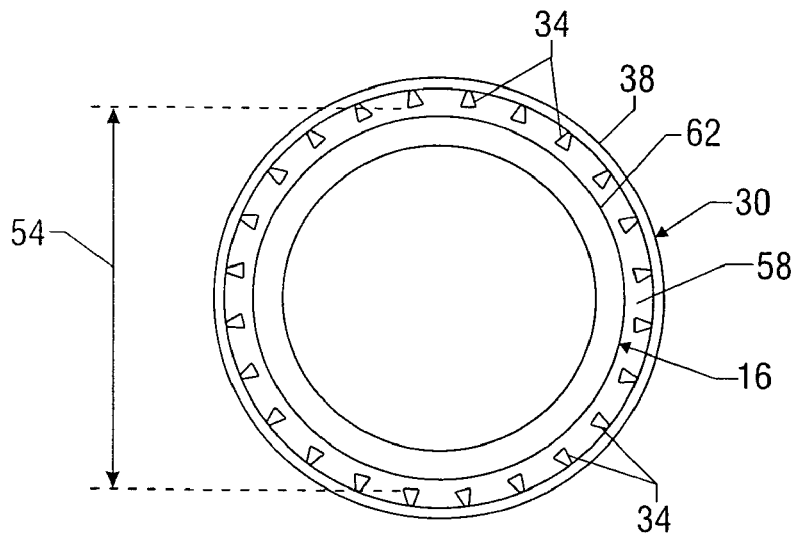
FIG. 5 is an end view of an embodiment of a screen assembly in accordance with the present invention having a heated screen jacket disposed over a base pipe.

Referring to FIGS. 4 and 5, in accordance with an embodiment of the present invention, the screen jacket 30 is constructed of a suitable material and with an inner diameter 50 (FIG. 4) so that when the screen jacket 30 is heated as desired, the screen jacket 30 expands to a heated inner diameter 54 (FIG. 5) that is larger than both its original inner diameter 50 and the outer diameter 26 of the base pipe 16. For example, the screen jacket 30 may be constructed of stainless steel, such as 316L, and have an original inner diameter 50 that is substantially the same as, or smaller than, the outer diameter 26 of the base pipe 16.

Figure 6:
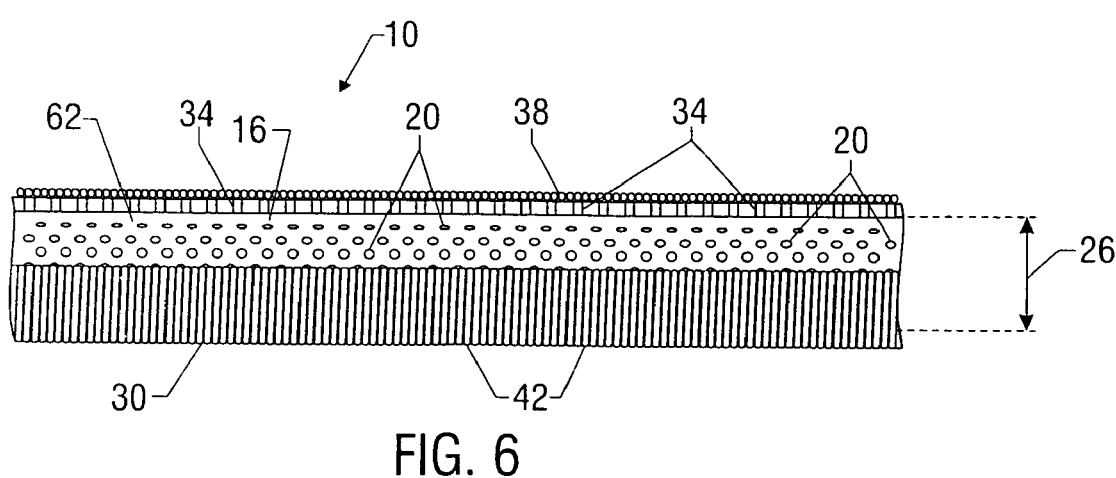
FIG. 6 illustrates an embodiment of a screen assembly in accordance with the present invention having a cooled screen jacket disposed over and engaging a base pipe.
Figure 7:
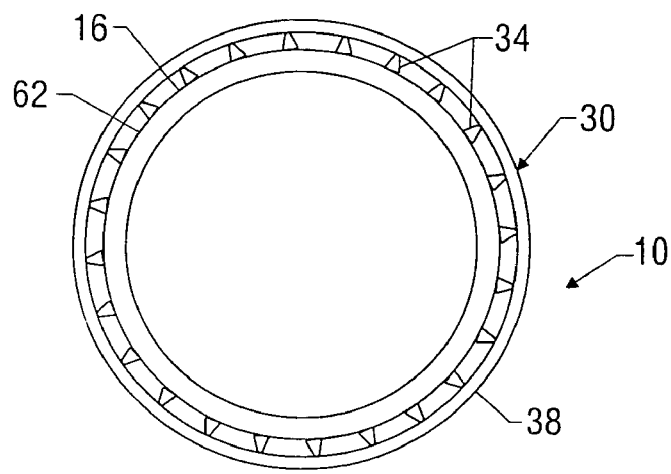
FIG. 7 is an end view of the screen assembly of FIG. 6.

When the screen jacket 30 is heat-expanded to its heated inner diameter 54, it fits over the base pipe 16. In the embodiment of FIG. 5, for example, the illustrated screen jacket 30 fits over the base pipe 16 generally without frictional contact therebetween. A gap 58 is formed between the ribs 34 of the screen jacket 30 and the outer surface 62 of the base pipe 16. After the screen jacket 30 cools, it contracts and its inner diameter decreases so that the ribs 34 generally engage the base pipe 16. In the example of FIGS. 6 and 7, the illustrated ribs 34 of the cooled screen jacket 30 tightly engage the base pipe 16 to form an interference fit. The resulting screen assembly 10 of this embodiment is useful, for example, in a downhole environment. However, the present invention is not limited in any way by screen assembly's use or environment. For example, the screen assembly 10 may be designed for use in outside-to-inside or inside-to the-outside flow applications.

Various other components may be included, but are not required for the present invention. For example, one or more end ring (not shown) and/or centralizer blade (not shown) may be used in conjunction with the screen jacket 30 or base pipe 16.

Figure 8:
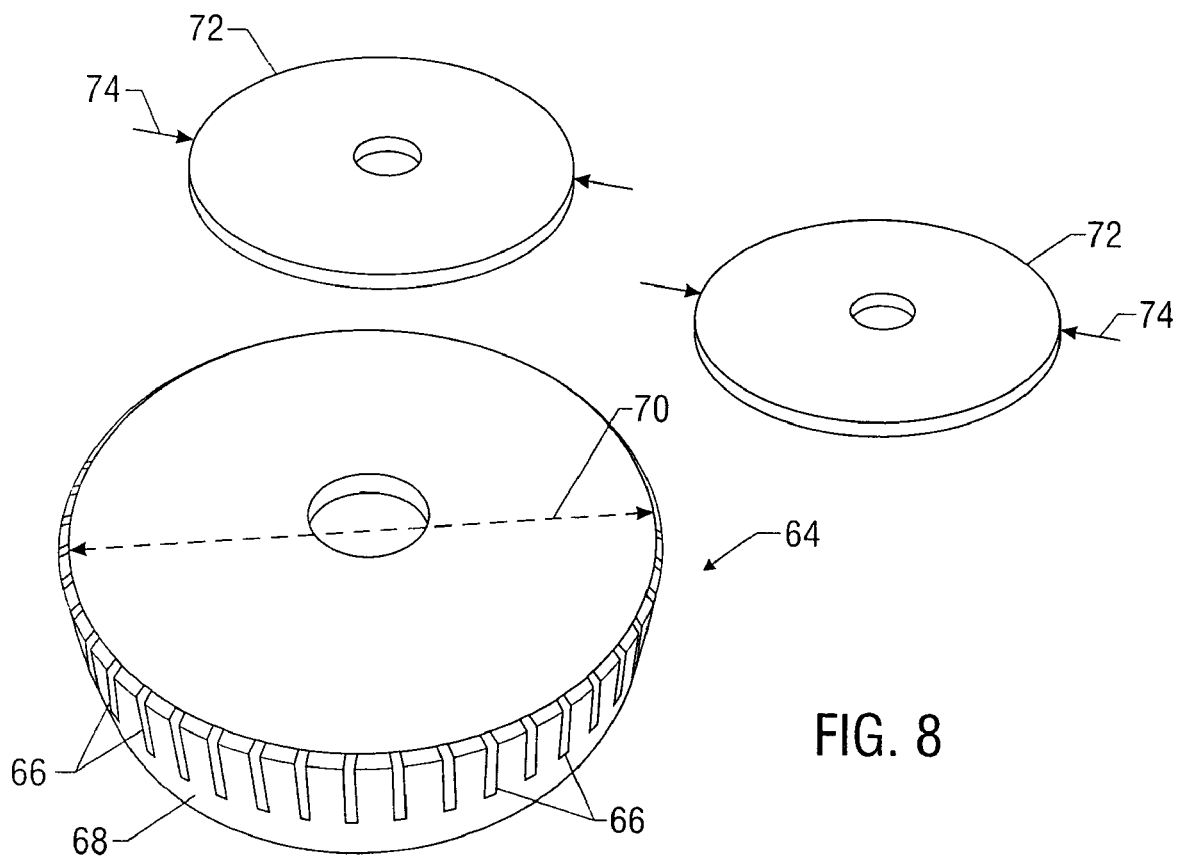
FIG. 8 is an embodiment of a tooling member and tooling rings in accordance with the present invention.

In another aspect, referring now to FIG. 8, one or more tooling members 64 may be used for forming the screen jacket 30, if desired. In this example, the tooling member 64 is circular and includes multiple channels 66 formed in its outer wall 68. The channels 66 will hold the rib members 34 in position while the wire 38 is wrapped around the ribs 34 for forming the screen jacket 30. The distance 70 between opposing channels 66 of the tooling member 64 will establish the original inner diameter 50 of the screen jacket 30. For example, a tooling member 64 having a distance 70 between opposing channels 66 of 5.500 inches may be used to form a screen jacket 30 having an inner diameter 50 of 5.500 inches.

Also if desired, in accordance with an embodiment of the present invention, one or more tooling rings 72 having a ring diameter 74 that is slightly greater than the distance 70 between opposing channels 66 of the tooling member 64 may be used in conjunction with the tooling member 64 to establish the inner diameter 50 of the screen jacket 30 formed with tooling member 64. To set the original inner diameter 50 of the screen jacket 30, the tooling ring 68 having a ring diameter 74 matching the desired inner diameter 50 is placed over the tooling member 64, essentially decreasing the useful depth of the channels 66 for securing the ribs 34. For example, a set of tooling rings 72 may be sized with ring diameters 74 that vary by increments of 0.010 inches.

Referring now to FIG. 9, a method of assembling a downhole screen assembly in accordance with an embodiment of the present invention will now be described. At stage 80, at least part of a pre-formed cylindrical screen jacket is heated so that its inner diameter becomes larger than the outer diameter of a base pipe. At stage 84, the base pipe is positioned at least partially inside the screen jacket. The screen jacket is allowed to cool and contract into engagement with the base pipe (stage 88). It should be understood that these heating and cooling stages of the screen jacket may be used for an entire length, or in selected zones, of the screen jacket. Further, multiple screen jackets may be used in this manner with a single base pipe.

FIG. 10 illustrates another method of assembling a downhole screen assembly in accordance with an embodiment of the present invention. For illustrative purposes, the screen assembly 10 of FIG. 6 will be referenced. In stage 92, a "pertinent" value for the outer diameter 26 of the base pipe 16 is determined. For example, the outer diameter of the base pipe may be measured at 5-foot increments along the perforated length of the base pipe 16, the average measured diameter being used as the pertinent outer diameter 26. Alternately, the smallest measured outer diameter may be used as the pertinent outer diameter 26. However, the pertinent outer diameter 26 may determined by any other desired methodology.

In this embodiment, the screen jacket 30 is then formed with a desired original inner diameter 50 (e.g. FIG. 4) based upon the pertinent outer diameter 26 of the base pipe 16 (stage 96). The specific size of the diameter 50 relative to the diameter 26 may vary depending upon one or more factors, such as, for example, the material construction and size of the screen jacket 30 and/or the size and temperature of the heating source used to subsequently heat the screen jacket 30.

If desired, one or more tooling members 64 and tooling ring 72 (e.g. FIG. 8) may be used to form the screen jacket 30. For example, a tooling member 64 having a distance 70 between opposing channels 66 that is equal to or less than the pertinent outer diameter 26 of the base pipe 16 may be selected. A tooling ring 72 having the appropriate ring diameter 74 may be used in conjunction with the tooling member 64. In either instance, a multitude of elongated, axially-oriented rib members 34 are placed in the channels 66 of the tooling member 64 and a wire 38 is radially wound around the ribs 34 in multiple wraps 42. Each wrap 42 of the wire 38 is spaced apart from adjacent wraps 42, forming slots 46 (e.g. FIG. 3). For example, thirty ribs 34 may be used, and each slot 46 between wire wraps 42 may have a width of 0.008" with a tolerance of 0.0015". However, the present invention is not limited to this construction technique or any of the above details; any other suitable technique may be used for forming the screen jacket 30.

In stage 100, the screen jacket 30 is heated at a sufficient temperature and for a sufficient duration to cause the screen jacket 30 to expand a desired amount. For a particular example, a thirty foot long screen jacket having an original inner diameter of 5.545" to be used with a base pipe having a pertinent outer diameter of 5.550" may be heated at approximately 1000° F. for approximately 15 minutes to expand the inner diameter of the screen jacket by 0.030". For other examples, Tables 1 and 2 provide various expected changes in the inner diameter of a section of screen jacket 30 having a length of between 1-18' that is heated for approximately 10-15 minutes at the designated temperature:

TABLE 1

| Base Pipe Outer Diameter | Screen Jacket Original ID | Increase in SJ ID at 600-800° F. | Increase in SJ ID at 1100° F. |
|---|---|---|---|
| 5.500-5.505" | 5.500" | 0.0347" | 0.0588" |
| 5.510-5.515 | 5.510 | 0.0348 | 0.0589 |
| 5.520-5.525 | 5.520 | 0.0349 | 0.0590 |
| 5.530-5.535 | 5.530 | 0.0350 | 0.0591 |
| 5.540-5.545 | 5.540 | 0.0351 | 0.0592 |
| 5.550-5.555 | 5.550 | 0.0352 | 0.0593 |
| 5.560-5.565 | 5.560 | 0.0353 | 0.0594 |

TABLE 1-continued

| Base Pipe<br>Outer Diameter | Screen Jacket<br>Original ID | Increase in SJ ID<br>at 600-800° F. | Increase in SJ ID<br>at 1100° F. |
|---|---|---|---|
| 5.570-5.575 | 5.570 | 0.0354 | 0.0595 |
| 5.580-5.585 | 5.580 | 0.0355 | 0.0596 |

TABLE 2

| Base Pipe<br>Outer Diameter | Screen Jacket<br>Original ID | Increase in SJ ID<br>at 600-800° F. | Increase in SJ ID<br>at 1100° F. |
|---|---|---|---|
| 6.625-6.630 | 6.625 | 0.0418 | 0.0710 |
| 6.635-6.640 | 6.635 | 0.0419 | 0.0711 |
| 6.645-6.650 | 6.645 | 0.0420 | 0.0712 |
| 6.655-6.660 | 6.655 | 0.0421 | 0.0713 |
| 6.665-6.670 | 6.665 | 0.0422 | 0.0714 |
| 6.675-6.680 | 6.675 | 0.0423 | 0.0715 |
| 6.685-6.690 | 6.685 | 0.0424 | 0.0716 |
| 6.695-6.700 | 6.695 | 0.0425 | 0.0717 |
| 6.700-6.705 | 6.700 | 0.0426 | 0.0718 |

The Tables above also provide a proposed size of base pipe 16 with which the corresponding screen jacket may be used. It should be understood, however, that the present invention is in no way limited to the example cited herein or the sample data of Tables 1 and 2 and the temperature and duration of heating of the screen jacket may vary as is necessary and desired in particular situations and applications. For example, heating temperatures may range from approximately 800-1,400° F. and heating durations may range from approximately 10-45 minutes in certain situations. Moreover, the present invention is not limited by the heating duration or temperature, unless and only to the extent as may be expressly recited in particular patent claims.

Any desirable technique may be used for heating the screen jacket 30. For example a 20' long commercially available oven or furnace may be used. For another example, one or more heat blankets may be used.

Still referring to the embodiment of FIG. 10, the base pipe 16 is then located at least partially inside the screen jacket 30, as desired (stage 104). For example, the screen jacket 30 (or multiple screen jackets 30) may be slipped onto, or slid over, the base pipe 16. The screen jacket 30 is then allowed to cool (stage 108). As the screen jacket 30 cools, it shrinks down or contracts into engagement with the base pipe 16. In particular in this embodiment, the ribs 34 of the cooled screen jacket 30 tightly engage the base pipe 16 to form an interference fit.

Various other processes may be included, but are not required for the present invention. For example, a centralizer blade (not shown) may be welded to, or otherwise connected between, multiple segments of screen jacket 30 engaged over a single base pipe 16. For another example, one or more end ring (not shown), such as for enclosing the ends of the screen jacket 30, may be engaged with or over the screen jacket 30, base pipe 16 or both, such as by heat shrinking, welding or a combination thereof.

Preferred embodiments of the present invention thus offer advantages over the prior art and are well adapted to carry out one or more of the objects of the invention. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods described above and claimed herein and any other methods which may fall within the scope of the appended claims can be performed in any desired suitable order and are not necessarily limited to the sequence described herein or as may be listed in the appended claims. Further, the methods of the present invention do not require use of the particular embodiments shown and described in the present application, but are equally applicable with any other suitable structure, form and configuration of components.

While preferred embodiments of this invention have been shown and described, many variations, modifications and/or changes of the system, apparatus and methods of the present invention, such as in the components, details of construction and operation, arrangement of parts and/or methods of use, are possible, contemplated by the patent applicant, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and the scope of the invention and the appended claims should not be limited to the embodiments described and shown herein.

The invention claimed is:

1. A method of securing a cylindrical screen jacket to a base pipe, the base pipe having a pertinent outer diameter, the cylindrical screen jacket having a plurality of elongated ribs extending axially along the inner diameter thereof and at least one wire wrapped radially around the elongated ribs in multiple spaced wraps, the method comprising:
   separate from the base pipe, forming the cylindrical screen jacket with an original inner diameter that is equal to or smaller than the pertinent outer diameter of the base pipe;
   inserting the cylindrical screen jacket into an oven or furnace;
   heating the cylindrical screen jacket in the oven or furnace to expand the cylindrical screen jacket so that the inner diameter of the cylindrical screen jacket becomes greater than the pertinent outer diameter of the base pipe;
   positioning the base pipe at least partially within the heated cylindrical screen jacket; and
   allowing the cylindrical screen jacket to cool and shrink fit onto the base pipe to form an interference fit between the elongated ribs and the base pipe.

2. The method of claim 1, further comprising forming the cylindrical screen jacket with accurate, consistent spacing between wire wraps.

3. The method of claim 2, wherein the engaged cylindrical screen jacket and base pipe form a screen assembly, further comprising inserting the screen assembly into a downhole environment for petroleum production operations.

4. The method of claim 3, wherein the cylindrical screen jacket is heated in an oven at between approximately 800° F.-1200° F. for between approximately 10-15 minutes.

5. The method of claim 4, wherein the base pipe is slid into the cylindrical screen jacket.

6. The method of claim 3, further comprising heat shrinking at least one end ring at least partially onto the cylindrical screen jacket and welding the at least one end ring to the base pipe.

7. The method of claim 3, wherein the elongated ribs of the cylindrical screen jacket firmly engage the base pipe along the entire length of the cylindrical screen jacket, avoiding relative movement therebetween during use.

8. The method of claim 1, further comprising measuring the pertinent outer diameter of the base pipe and determining the original inner diameter of the cylindrical screen jacket based thereupon, further comprising inserting at least a portion of the elongated ribs into adjacent channels formed in the peripheral edge of at least one disc-shaped tooling member and wrapping the at least one wire radially around the elongated ribs, wherein the depth of the channels of the at least one disc-shaped tooling member establishes the original inner diameter of the cylindrical screen jacket.

9. The method of claim 8, wherein each disc-shaped tooling member has inner and outer surfaces, further comprising placing at least one disc-shaped tooling ring along at least one among the inner and outer surfaces of each disc-shaped tooling member to establish the desired original inner diameter of the cylindrical screen jacket.

10. A method of assembling a screen assembly useful in a downhole environment, the screen assembly including a screen jacket and a base pipe having a pertinent outer diameter, the screen jacket including a plurality of elongated ribs extending axially at least partially along the inner diameter thereof and at least one wire wrapped radially around the elongated ribs in multiple spaced wraps, the method comprising:

separate from the base pipe, forming the screen jacket with precisely spaced wire wraps and an original inner diameter that is not larger than the pertinent outer diameter of the base pipe;

heating the screen jacket in an oven or furnace to expand the screen jacket so that the inner diameter of the screen jacket is greater than the pertinent outer diameter of the base pipe;

disposing the base pipe at least partially within the screen jacket; and allowing the screen jacket to cool and contract so that elongated ribs of the cooled screen jacket engage and form an interference fit with the base pipe.

11. The method of claim 10, wherein the screen jacket firmly engages the base pipe along the entire length of the screen jacket, avoiding relative movement therebetween during use without the necessity of welds therebetween.

12. The method of claim 11, further comprising using a tooling member to form the screen jacket, wherein at least a portion of the elongated ribs is placed in adjacent channels formed in the edge of the tooling member and the at least one wire is wrapped around the elongated ribs, the distance between opposing channels of the tooling member establishing the original inner diameter of the screen jacket.

13. The method of claim 12, further comprising using a tooling ring along with the tooling member to form the screen jacket with the original inner diameter, the tooling ring effectively adjusting the distance between opposing channels of the tooling member and, consequently, establishing the original inner diameter of the screen jacket.

14. The method of claim 13, further comprising establishing the size of the spaces between adjacent wire wraps to be consistent and within desired tolerances.

15. A method of manufacturing a screen assembly for downhole use, the screen assembly including at least one perforated base pipe and at least one screen jacket, the screen jacket including a plurality of elongated ribs extending at least partially along the inner diameter thereof, the method comprising:

determining the pertinent outer diameter of the perforated base pipe;

separate from the base pipe, forming the screen jacket to be cylindrical in shape and to have an original inner diameter that is equal to or smaller than the pertinent outer diameter of the perforated base pipe;

inserting the cylindrical screen jacket into an oven or furnace;

heating the screen jacket in the oven or furnace to cause the inner diameter of the screen jacket to expand a desired extent;

locating the perforated base pipe at least partially within the screen jacket; and allowing the screen jacket to cool so that it contracts and forms an interference fit between elongated ribs thereof and the perforated base pipe.

16. The method of claim 15, wherein the screen jacket is resistant to movement relative to and separation from the base pipe.

17. The method of claim 16, wherein the screen jacket is resistant to collapsing and deforming during use.

18. The method of claim 17, further including deploying the base pipe and screen jacket into a borehole, whereby the screen jacket is resistant to movement relative to and separation from the base pipe.

19. The method of claim 18, further comprising connecting a centralizer blade between first and second screen jackets that are heat shrunk on the base pipe.

20. The method of claim 15, wherein the elongated ribs of the screen jacket firmly engage the base pipe along the entire length of the screen jacket, avoiding relative movement therebetween during use.

21. The method of claim 20, further comprising determining the original inner diameter of the screen jacket based upon the pertinent outer diameter of the base pipe, further comprising forming the screen jacket by inserting at least a portion of the elongated ribs into channel formed into at least one disc-shaped tooling member and wrapping at least one wire radially around the elongated ribs, wherein the distance between opposing channels of the at least one disc-shaped tooling member establishes the original inner diameter of the screen jacket.

22. The method of claim 21, wherein each disc-shaped tooling member has inner and outer surfaces, further comprising placing at least one disc-shaped tooling ring along at least one among the inner and outer surfaces of each disc-shaped tooling member to establish the desired original inner diameter of the screen jacket.

23. The method of claim 20 further comprising forming the cylindrical screen jacket with accurate, consistent and precise spacing between wire wraps.

* * * * *